Feb. 4, 1964 F. W. WITZKE 3,120,121
SURFACE ANALYZER DEVICE
Filed Aug. 19, 1960 3 Sheets-Sheet 2
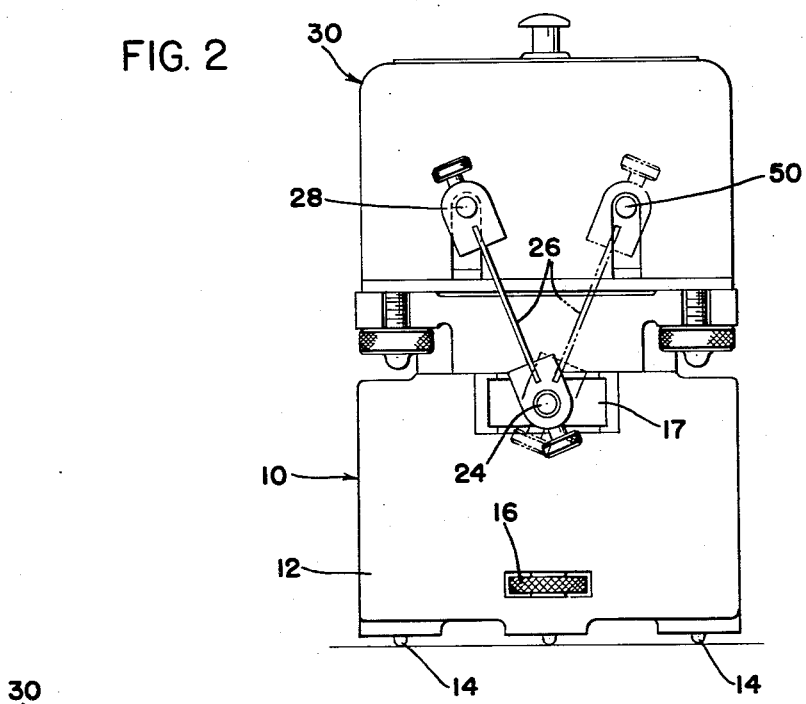
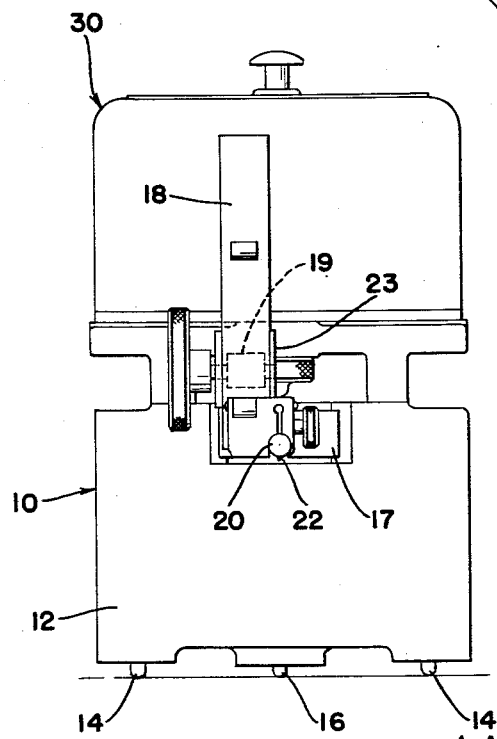
INVENTOR.
FREDERICK W. WITZKE
ATTORNEYS Feb. 4, 1964  F. W. WITZKE  3,120,121
SURFACE ANALYZER DEVICE
Filed Aug. 19, 1960  3 Sheets-Sheet 3

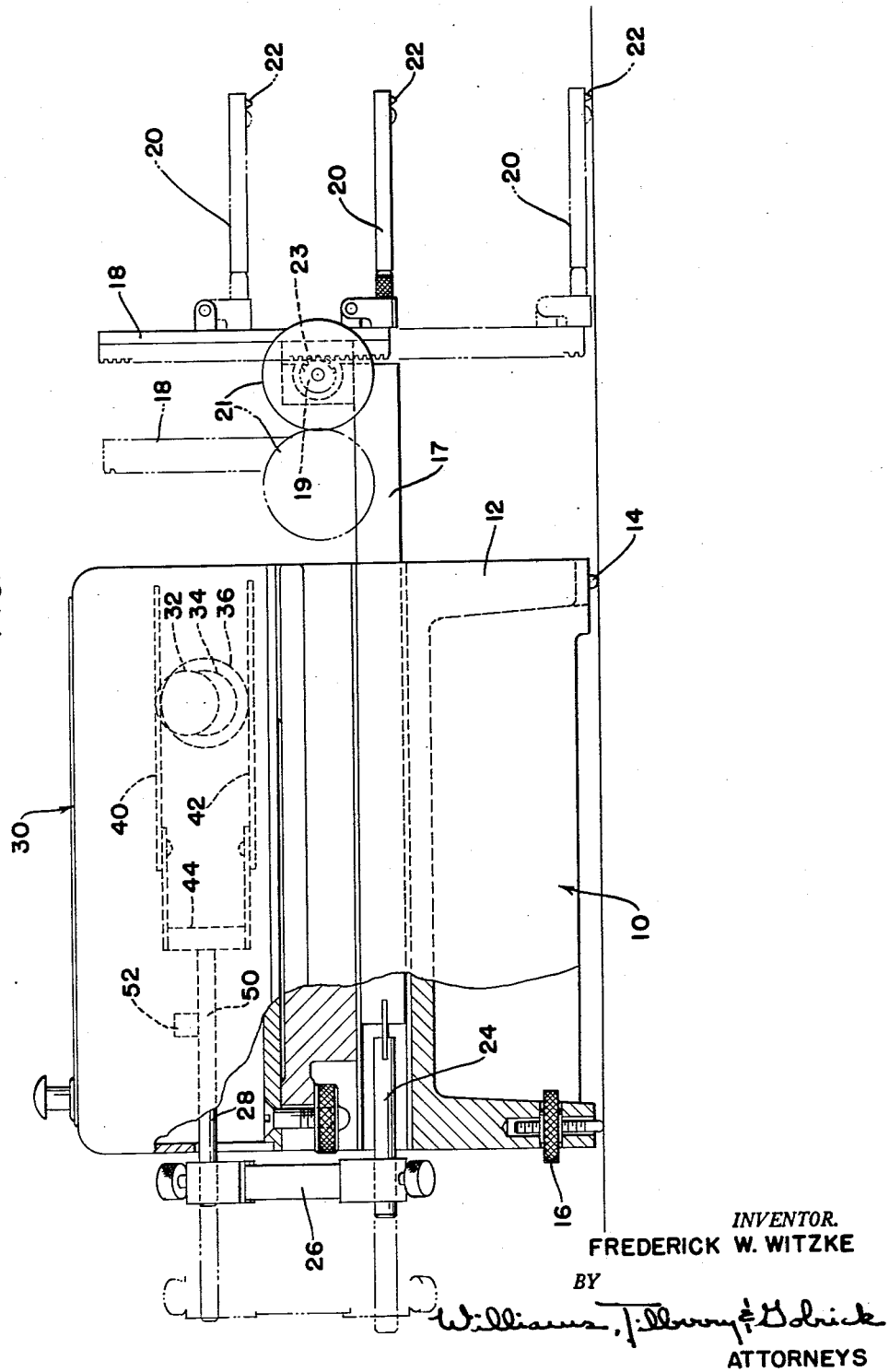

INVENTOR.
FREDERICK W. WITZKE
BY
ATTORNEYS

United States Patent Office 3,120,121
Patented Feb. 4, 1964

3,120,121
SURFACE ANALYZER DEVICE
Frederick W. Witzke, Cleveland, Ohio, assignor to Cleveland Instrument Company, Cleveland, Ohio, a corporation of Ohio
Filed Aug. 19, 1960, Ser. No. 50,713
3 Claims. (Cl. 73—105)

This invention relates to instruments depending on electrical amplification of the motion of a stylus perpendicular to a surface over which the stylus is traversed or traced, for use in measuring surface roughness. More particularly, this invention is concerned with a tracer type instrument employing a stylus tracer and, especially the employment of a stylus tracer supported and moved by a pilot slide, wherein the tracer stylus is mounted at the end of a suitable beam.

Smoothness and roughness are relative terms, i.e., surfaces may be either smooth or rough for the purpose intended; what is smooth for one purpose may be rough for another purpose. However, magnified profiles of all surfaces no matter how smooth consist of a series of peaks and valleys which deviate in a more or less irregular fashion above and below a mean surface. Superimposed on these major peaks and valleys are irregularities of lesser magnitude.

Most surfaces of engineering interest are of the extremely complex type consisting of more or less randomly distributed irregularities covering a wide range of both height and spacing. To assign a single number of technical significance to a surface requires the selection of certain features of a surface for measurement. The quantity which has been found most useful in characterizing a surface is the average roughness heighth, and the most common method of measuring this average roughness is to move a sharp-pointed stylus over the surface, and to translate this motion perpendicular to the surface into a meter-reading proportional to the average roughness. Otherwise stated, roughness may be measured against a mean or center reference line parallel to the general direction of the profile, such that the sums of the areas which lie on either side of the line are equal. The stylus dimensions will, of course, determine the smallness of the irregularities which will be included in an instrument measurement.

In prior art devices, a pilot slide is fixably mounted on a surface plate customarily about thirty inches square, or larger, and having a predetermined reference surface finish. These surface plates are sometimes prepared from granite or a like material not susceptible to deformation over normal ranges of ambient temperature fluctuation. It is not unusual for a device of this class to weigh one hundred pounds or more, thus rendering it relatively immobile. With the equipment thus described, the part to be analyzed is placed on the surface plate, and the stylus is brought into engagement with the surface of interest. It is readily apparent that with apparatus of this sort, the types and sizes of workpieces which can be analyzed are limited to those which can be suitably placed on the surface plate. Additionally, prior art pilot slide type surface analyzers are not readily susceptible, if at all, to conversion to the more common skid-type surface analyzing equipment.

It is, therefore, among the objects of my invention to provide: a surface roughness gage of the pilot slide type wherein a mechanical skid trace device may be converted into a pilot slide surface analyzer and vice versa; a surface roughness analyzer which can be used on any convenient suitable surface; a surface roughness analyzer which can be used on the workpiece itself; and a pilot slide type surface analyzer which can be converted at anytime for skid-type measurement operations.

The features of this invention which are believed to be novel are set forth with particularity in the appended claims. The invention itself, however, both as to its organization and use, together with further objects and advantages thereof, may best be understood by reference to the following description taken in conjunction with the accompanying drawings in which:

FIGURE 1 is a side elevational view of a preferred embodiment of the invention, with some parts broken away and others in phantom outline;

FIGURE 2 is a rear elevational view of the preferred embodiment of the invention shown in FIGURE 1;

FIGURE 3 is a front elevational view of the preferred embodiment of the structure shown in FIGURE 1;

Figure 5:
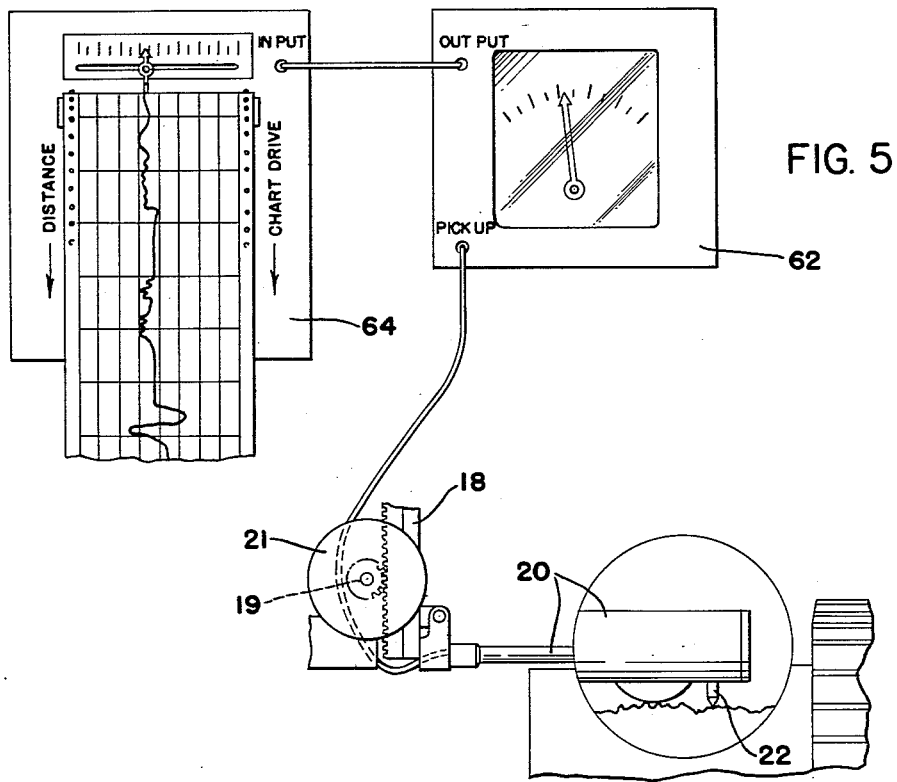
FIGURE 5 is a fragmentary partially enlarged schematic representation of meter and chart means employed in association with the invention.

Reference will now be made to the drawings in greater detail.

The general organization of the invention comprises: a pilot slide member 10, including a base 12 mounted on supporting pads 14, and provided with a screw adjustment leveling mechanism 16. A precision pilot slide 17 is mounted in accurately machined ways so as to be reciprocable in a horizontal path within the tolerance demanded by the surface to be gaged. The actual roughness of the surface being traced will be generally within the range of from 1 to 1,000 micro-inches, so that the slide 17, in order to function as a plane of reference, must be correspondingly more accurate with respect to vertical deviation. The manufacture of such a slide within the degree of accuracy required is within the skill of the art, and does not constitute a portion of this invention.

An upstanding member 18 is adjustably secured to the free end of the slide 17 and is adapted to carry a beam 20 pivotally mounted thereon for vertical adjustment therewith. Member 18 is in the form of a rack, engaged by pinion 19 operable by hand knob 21 to vertically adjust beam 20. A tracer probe 22 is affixed to the free end of the beam 20, and the particular configuration and size of this tracer probe will depend on the particular requirements of the surface to be analyzed. The probe 22 is mechanically connected to an armature in electromagnetic transducer 23, so that movement of the armature corresponding to movement of the probe develops a faint signal proportionate to the probe movement, all of which is well understood by those skilled in the art. An extension beam 24 is secured to the opposite end of the precision slide 17 to carry thereon a connecting member 26 secured to the free end of a drive shaft 28 which is a portion of the drive means contained in the upper member 30, now to be described more fully.

Figure 4:
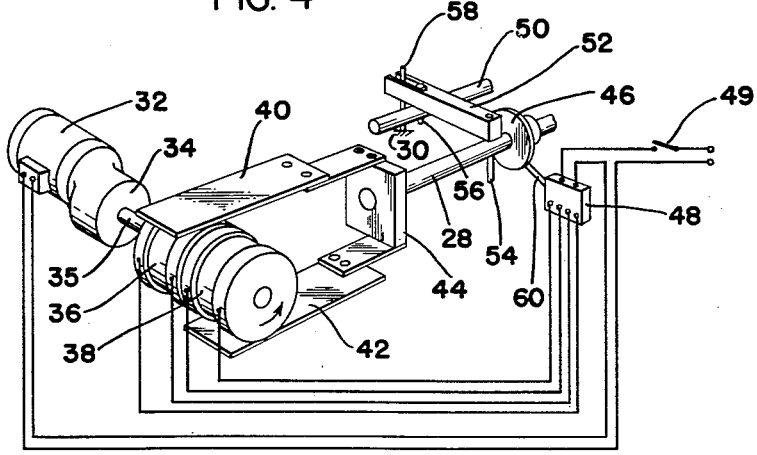
FIGURE 4 is a perspective schematic illustration of the drive means employed in the preferred embodiment of the invention.

Referring to FIGURE 4, the drive mechanism contained in member 30 comprises: a high speed motor 32 preferably of the order of 3,000 r.p.m. connected to a gear reduction box 34 which reduces the 3,000 r.p.m. of an input shaft (internally connected, and therefore not shown) to 2 r.p.m. of the output shaft 35. A pair of electro-magnetic couplers 36 and 38, cylindrical in shape, are secured to the output shaft 35 and each coupler is selectively magnetized alternately one with respect to the other. A pair of ferro-magnetic diametrically opposed plates 40 and 42 are in contact with couplers 36 and 38 respectively, for parallel rolling contact with said couplers. Connecting bracket means 44 joins plate 40 to plate 42 for unitary reciprocal movement, and drive shaft 28 is integrally and rigidly secured to the connecting bracket 44. A detent flange 46 is also secured to drive shaft 28 to actuate limit switch means 48 connected to electromagnetic couplers 36 and 38 for the purpose of energizing one coupler and de-energizing the other, when switch 49 is closed.

A second drive shaft 50 is secured to the first mentioned drive shaft 28 by a yoke 52 pivotally secured to both drive shafts by pivotal pin means 54 and 56. Yet a third pivotal pin 58 pivotally anchors the end of yoke 52 remote from pin 54, and is anchored to upper member 30. Thus, a simple but reliable differential transmission is provided whereby movement of drive shaft 28 provides a proportionately lesser movement in drive shaft 50.

In operation, motor 32 is energized to turn the electromagnetic couplers 36 and 38 about the shaft 35, and depending upon the position of the limit switch 48, one of the couplers is energized (for purposes of description, coupler 38) to make magnetic engagement with plate 42 to urge drive shaft 28 from left to right. When detent flange 46 engages limit switch flag member 60, coupler 38 is de-energized and coupler 36 then becomes energized. At this moment coupler 36 becomes the driving member and coupler 38 is an idler member, wherein plate 40 is then driven in the opposite direction, or from right to left, to reverse the mechanism. It will be observed that with the electromagnetic drive means there is no necessity for motor reversal and a very short reversing time is accomplished without vibration or backlash.

Movement of either drive shaft 28 or 50 translates reciprocaitng movement through connector means 26 to pilot slide 17 which in turn reciprocates beam 20 to which the tracer pick-up probe 22 is affixed.

The faint signal generated by transducer 23 is carried to combination amplifier and meter 62 for amplification and recording. The amplifier 62 may in turn be connected to a permanent record surface profile chart means 64.

By the simple expedient of disconnecting connecting means 26 from pilot slide extension 24, and separating base 12 from upper member 30, the upper member 30 is converted to skid tracing use wherein pick-up probe 22 and transducer 23 is secured to either drive shaft 28 or 50. Upper member 30 may then be placed directly adjacent to the surface to be analyzed.

This invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A surface analyzing device comprising:
   first and second electromagnetic, rotatably mounted cylindrical couplers,
   means to rotate said couplers,
   means to alternately energize said couplers,
   first and second ferro-magnetic plates mounted for engagement with said first and second couplers respectively on opposite sides of the axis of rotation of said couplers,
   connecting means between said plates,
   a first drive shaft mounted on said connecting means, whereby one energized coupler moves said first drive shaft in one direction and the other energized coupler reverses the movement of said first drive shaft without reversal of said coupler reversal means,
   a second drive shaft,
   a yoke bridging said first and second drive shafts,
   pivotal pin means connecting said yoke to said drive shafts,
   means to pivotally anchor one end of said yoke whereby movement of said first drive shaft differentially shifts said second drive shaft,
   a surface analyzing probe operatively secured to said second drive shaft, and
   indicator means connected to said probe to note irregularities of a surface.

2. The device set forth in claim 1, wherein the end of said yoke adjacent said second drive shaft is pivotally anchored, whereby said first drive shaft shifts said second drive shaft at a slower rate than the movement of said first drive shaft.

3. The device set forth in claim 1 wherein said means to alternately energize said couplers includes a limit switch actuated by said first drive shaft.

References Cited in the file of this patent
UNITED STATES PATENTS

| | | |
|---|---|---|
| 2,178,641 | Neumann | Nov. 7, 1939 |
| 2,491,016 | Reason | Dec. 13, 1949 |
| 2,620,655 | Priest | Dec. 9, 1952 |